(12) United States Patent
Taylor

(10) Patent No.: US 7,272,836 B1
(45) Date of Patent: Sep. 18, 2007

(54) METHOD AND APPARATUS FOR BRIDGING SERVICE FOR STANDARD OBJECT IDENTIFIER BASED PROTOCOLS

(75) Inventor: Kurt Russell Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1571 days.

(21) Appl. No.: 09/583,411

(22) Filed: May 31, 2000

(51) Int. Cl.
*G06F 3/00* (2006.01)
(52) U.S. Cl. ...................................... 719/328
(58) Field of Classification Search .............. 709/311; 719/310, 328
See application file for complete search history.

(56) References Cited

U.S. PATENT DOCUMENTS

| | | | | |
|---|---|---|---|---|
| 4,468,728 | A | * | 8/1984 | Wang ............................ 707/1 |
| 5,913,037 | A | * | 6/1999 | Spofford et al. ............ 709/226 |
| 5,951,649 | A | * | 9/1999 | Dobbins et al. ............ 709/238 |
| 6,016,499 | A | * | 1/2000 | Ferguson .................. 707/104.1 |
| 6,023,684 | A | * | 2/2000 | Pearson ......................... 705/35 |
| 6,085,030 | A | * | 7/2000 | Whitehead et al. .......... 709/203 |
| 6,226,649 | B1 | * | 5/2001 | Bodamer et al. ........ 707/104.1 |
| 6,484,177 | B1 | * | 11/2002 | Van Huben et al. .......... 707/10 |
| 6,658,432 | B1 | * | 12/2003 | Alavi et al. ............... 707/104.1 |
| 6,775,661 | B1 | * | 8/2004 | Redner ........................... 707/3 |

OTHER PUBLICATIONS

Leslie Daigle, Monthly report, Jun. 15, 1997.*

* cited by examiner

*Primary Examiner*—William Thomson
*Assistant Examiner*—LeChi Truong
(74) *Attorney, Agent, or Firm*—Duke W. Yee; Libby Z. Handelsman; Gerald H. Glanzman

(57) ABSTRACT

A method and apparatus is presented for maintaining a logical composite repository of Object Identifier (OID) tree structures on a server in a distributed data processing system. Each OID subtree repository has been programmed to interface with an application programming interface (API) associated with an OID abstraction layer for the logical composite repository. An OID subtree structure can be added to the logical composite repository resulting in registration with the OID abstraction layer. Any query from a requester in the distributed data processing system about an object contained in the logical composite repository associated with the server is processed by the OID abstraction layer. The query must be in a protocol, such as SNMP, LDAP, and CIM/XML, recognized by the OID abstraction layer. The repository associated with the object of the query is determined from the OID abstraction layer registry. The query is formatted to be consistent with the API associated with the OID abstraction layer and sent to the repository associated with the object. When a reply is received from the repository, it is formatted in the protocol of the original query and sent to the requester in the distributed data processing system.

36 Claims, 3 Drawing Sheets

METHOD AND APPARATUS FOR BRIDGING SERVICE FOR STANDARD OBJECT IDENTIFIER BASED PROTOCOLS

BACKGROUND OF THE INVENTION

1. Technical Field

The present invention relates generally to improved remote management and in particular to a method and an apparatus for accessing standard object identifiers using any one of a plurality of standard object identifier based protocol methods.

2. Description of the Related Art

An Object Identifier (OID) is an Internet standard mechanism for uniquely naming objects that represent information to be remotely managed. Specifically, this mechanism is called the Structure of Management Information (SMI). SMI allows a uniquely identified piece of management information (or object), and attributes of this object, to be retrieved, managed and monitored. Many network management protocols make use of this Internet Engineering Task Force (IETF) SMI standard.

The Simple Network Management Protocol (SNMP) is a widely used network monitoring and control protocol that makes use of OIDs. SNMP agents report information from various network components, such as hubs, routers, and bridges, to a workstation console used to manage the network. This information is contained in a Management Information Base (MIB), which is a data structure that defines what information is obtainable from the network component and what can be controlled by the network component. SNMP is a simple protocol as it does not contain relations like the two protocols discussed next.

Lightweight Directory Access Protocol (LDAP) is another example of a management protocol that uses SMI OIDs. It is a simplified version of the X.500 standard. LDAP support is implemented in Web browsers and e-mail programs, which can query an LDAP-compliant directory. Queries in LDAP can be complex, such as the query for what printer objects can be accessed by a particular user object.

The Common Information Model (CIM) also describes management information in an OID format. CIM is implementation independent, allowing different management applications to collect the required data from a variety of sources. CIM includes schemas for systems, networks, applications and devices, among others. It also provides data mapping definitions for the use of SNMP data from within a CIM schema.

Currently if a server is processing queries using a variety of protocols, it must keep a separate repository of objects for each protocol. Often these repositories contain references to the same object, albeit with a different object identifier. If an object is being changed in different ways through two or more protocols, this can lead to inconsistencies. A single repository can eliminate such inconsistencies and save storage space since each object would only appear once.

Furthermore, because providing support for each protocol may be cumbersome to developers of management applications, some of these developers have resorted to only supporting one or a few of these protocols. Thus, not all objects, i.e. network resources, may be represented in each repository. As a result queries for objects not handled by the a particular protocol will not be able to be completed.

Therefore, it would be advantageous to have a method and an apparatus that provides a common repository for all OID-based objects regardless of the protocol scheme and yet still allow queries from each of a variety of protocols, such as SNMP, LDAP, and CIM/XML. Furthermore, it would be advantageous to make the repository easily expandable to accept existing OID-based data trees from a current repository and seamlessly integrate the new repository into the combined logical repository.

SUMMARY OF THE INVENTION

A method and apparatus is presented for maintaining a logical composite repository of Object Identifier (OID) tree structures on a server in a distributed data processing system. Each OID tree structure has been programmed to interface with an application programming interface (API) associated with an OID abstraction layer for the composite repository. An OID subtree structure can be added to the composite repository resulting in registration with the OID abstraction layer and, in addition, an OID subtree structure can be removed from the composite repository resulting in removal of the OID subtree structure from the registry associated with the OID abstraction layer.

Any query from a requester in the distributed data processing system about an object contained in the logical composite repository associated with the server is processed by the OID abstraction layer. The query must be in a protocol, such as SNMP, LDAP, and CIM/XML, recognized by the OID abstraction layer. The repository associated with the object of the query is determined from the OID abstraction layer registry. The query is formatted to be consistent with the API associated with the OID abstraction layer and sent to the repository associated with the object. When a reply is received from the repository, it is formatted in the protocol of the original query and sent to the requester in the distributed data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
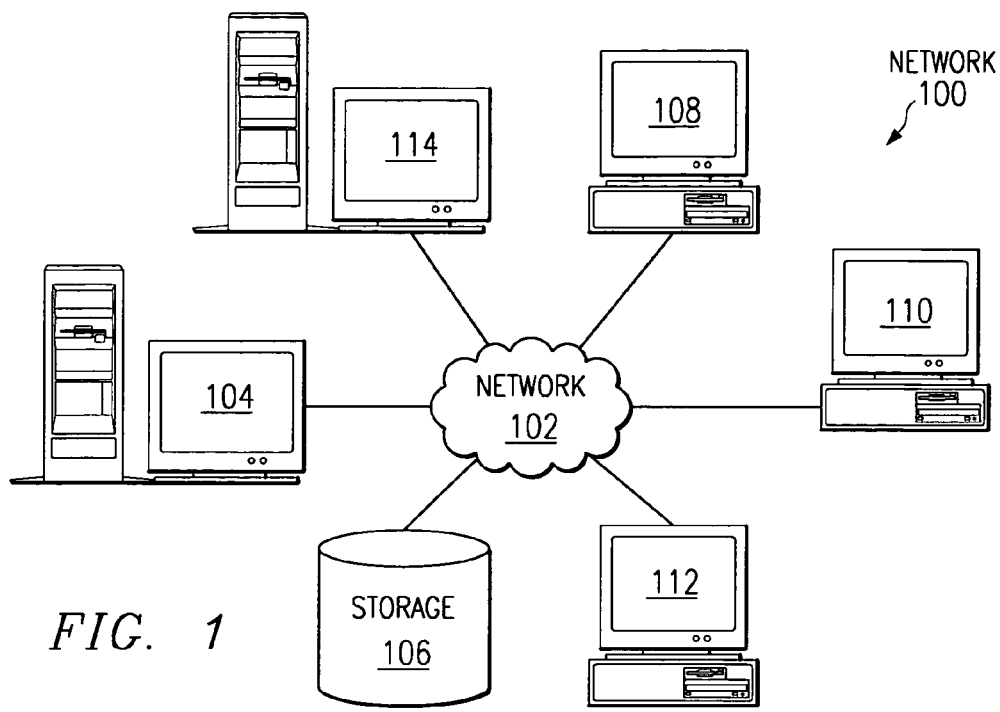
FIG. 1 is an exemplary diagram of a distributed data processing system in which the present invention may be implemented.

With reference now to the figures, FIG. 1 depicts a pictorial representation of a distributed data processing system. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN).

A management server 114 is connected to the network 102. The management server 114 remotely manages the various network devices 104-112 based on management information gathered from the network devices 104-112. While a management "server" is shown in FIG. 1, the management functions of the present invention may be performed by a management application resident on any type computing device connected to the network 102.

These network devices are remotely managed using either a standard protocol, such as SNMP, LDAP, and CIM/XML, or another equivalent management protocol. Queries can be submitted using the supported protocols to the server machines.

FIG. 1 is intended as an example, and not as an architectural limitation for the present invention. As may be readily apparent to those of ordinary skill in the art, many other types of devices may be connected to the network 102 without departing from the spirit and scope of the present invention. For example, the network 102 may provide a communication pathway for client devices to send and receive data from printers, plotters, scanners, multiple drive libraries, and the like.

As will be described in greater detail hereafter, the managed server, such as 104, for example, includes an OID abstraction layer and application program interface (API) for communicating with either a plurality of repositories or a single combined repository, depending on the particular embodiment, as will be described hereafter. The OID abstraction layer receives queries for objects in any of a number of different protocols, such as SNMP, LDAP or CIM/XML, and the like, from a management application running in a management server 114.

The OID abstraction layer identifies the object in the query, determines a repository in which the object is represented, and sends a request to the repository for the desired object via the API. The repository responds to the API with the object information which is placed into a reply message formatted for the proper protocol and sent to the requesting application.

Figure 2:
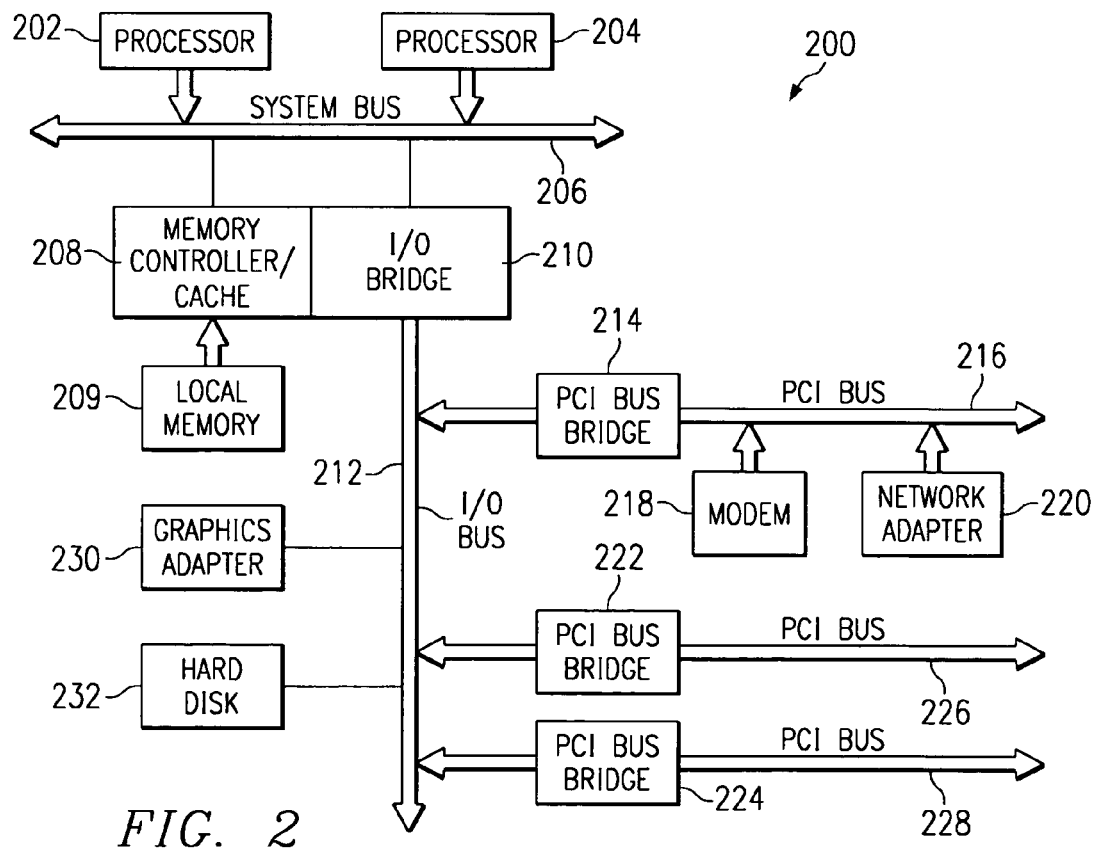
FIG. 2 is an exemplary block diagram of a server in which the present invention may be implemented.

Referring to FIG. 2, a block diagram of a data processing system that may be implemented as a management server or a managed server, such as management server 114 or managed server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

The management server, such as management server 114, includes one or more network device management applications used to remotely manage a plurality of network devices 104-112 over a network 102. These one or more network device management applications may be stored, for example, in local memory 209, for example, and used to control the operations of the processor 202 or 204 on a remotely managed server 104. As mentioned above, in a preferred embodiment of the present invention, the management server 114 manages the network devices 104-112 using a protocol such as SNMP, LDAP, CIM/XML, or a proprietary scheme.

Since it is often necessary to support multiple protocols on the same server, in known systems, a separate repository and processing system must be maintained for each protocol. Furthermore, the same object might be referenced by different schemes and information may be changed in an inconsistent manner so that the same query made using different protocols produces different results.

The present invention provides an OID abstraction layer and API executed by the processor 202 and/or 204 of the managed server 200, for interpreting queries in various protocol formats, determining a repository in which requested object information is resident, sending a request message to the identified repository, and inserting the received object information into a message formatted for the appropriate protocol.

Figure 3A:
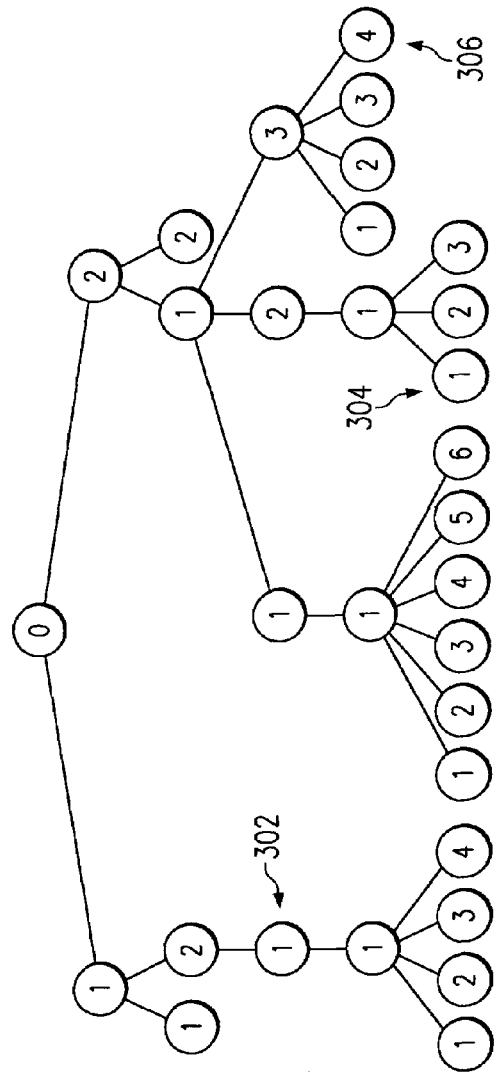
FIG. 3A is an exemplary diagram of a standard object identifier tree illustrating the naming of nodes.

FIG. 3A is an exemplary diagram of a standard object identifier (OID) tree data structure that can be processed by the present invention. FIG. 3A is only intended to be a simplified depiction of a fictitious tree data structure that will aid in the understanding of the present invention and does not necessarily correspond to an actual standardized tree data structure. It should be noted that, while FIG. 3A depicts some nodes as having a single branch, these nodes may contain additional branches which are not shown for clarity. FIG. 3A is only an example to illustrate the OID numbering scheme and a different tree data structures of more or less complicated architectures are possible.

As shown in FIG. 3A, the nodes of the tree data structure designate "objects" and are represented by object identifiers (OIDs). An "object" in the context of the tree refers to an entry in the tree. These OIDs are often referred to by their human readable branch names rather than their numerical value. Thus, for example, an object OID of a tree may have a numerical value but be referred to as "Age" or "Name" or the like. The objects of the tree represent tables and record entries within tables. Thus, for example, a table "Person" may be comprised of records having entries corresponding to an index, a name, and an age.

An OID tree structure starts with a single root labeled 0. This is a unique label in the tree so it is always easy to identify the root of the tree. A node may have no children or it may have any number of children. If there are n child nodes, then these child nodes are labeled with integer values 1 through n. Following the path from the root to a particular node gives a unique numeric name for the node. For example, the node 302 can be reached via root 0, the root's child 1, 1's child 2, and 2's child 1. This path is indicated by starting at the root and sequencing each node number, separated by a dot, until the desired node is reached. So node 302 is identified as "0.1.2.1".

Since every path starts at the root, which is uniquely numbered 0, every node below the root will have "0." at the start of its OID. Since this is always true, the "0." may be omitted without loss of clarity. Consequently, node 302 may be identified as "1.2.1". In a similar manner, node 304 is identified as "2.1.2.1.1" and node 306 is identified as, "2.1.3.4". As one of ordinary skill in the art will appreciate, this standardized numbering scheme will guarantee that each node in the tree will have a unique OID according to its path.

It is generally accepted that the IETF and other standards bodies maintain that every object that is standardized or registered is assigned a unique identification and this identification is never reassigned to another object, even if the original object no longer exists. The numbering scheme shown in FIG. 3A is representative of a complete tree for all objects, but, in reality, a server will only be managing very small subtrees of this complete tree. As we will see in FIG. 3B, the tree is very sparse. However, when a subtree is added to a server for the first time, it is generally accepted that it is guaranteed that the objects in the subtree have unique names.

For humans, these paths are long and laborious, so a symbolic name can be associated with a path. For example, the node for a printer may have the OID of 2.1.2.1.1, but it is much easier to read printer.printerTable.printerEntry.printerName.printer1.

A number of communication protocols make use of the OID tree structure for managing network resources. Some of these protocols include SNMP, LDAP, CIM/XML and the like. The present invention provides a mechanism by which each of these protocols is supported and object information represented in server repositories are equally accessible by queries provided in each of the other protocols.

Figure 3B:
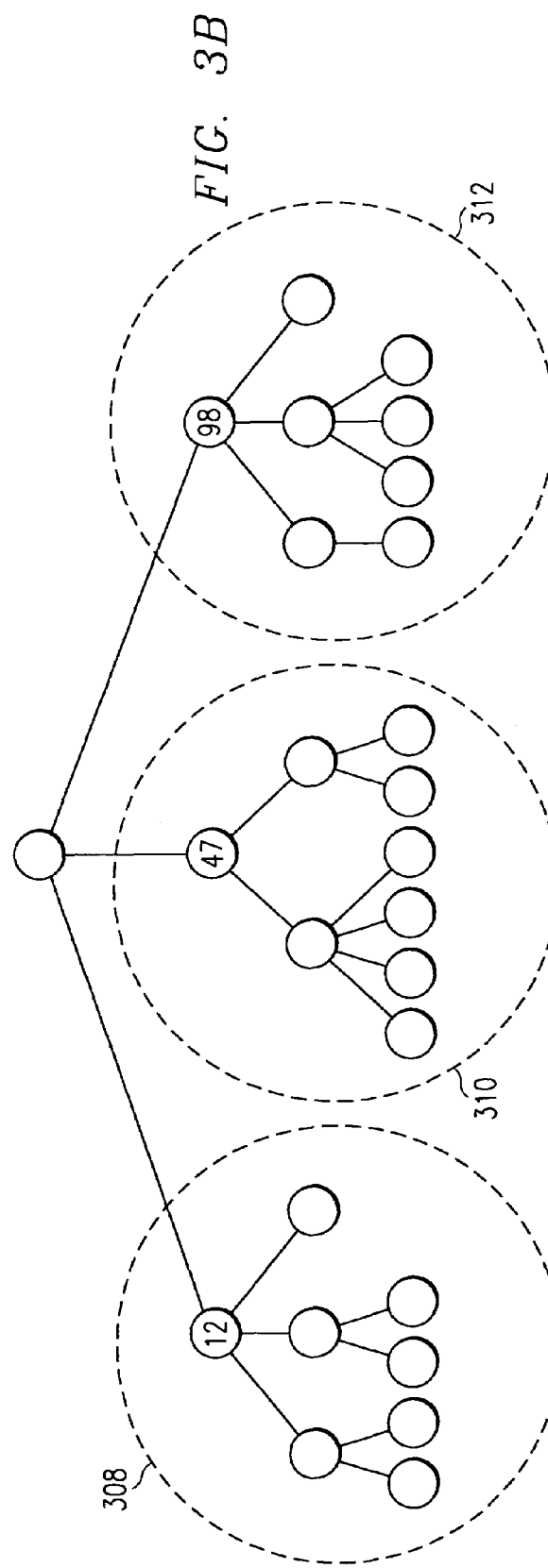
FIG. 3B is an exemplary diagram of a OID tree structure in accordance with the present invention.

FIG. 3B is an exemplary diagram of an OID tree structure in accordance with the present invention. As shown in FIG. 3B, the OID tree structure is separated into three subtrees 308, 310, and 312. These sections represent OID objects that are maintained by different repositories but the objects are contained in a logical composite tree. Thus, for example, a first subtree 308 may represent a first set of objects that are SNMP objects. A second subtree 310 may represent a second set of objects that are CIM objects. A third subtree 312 may represent a third set of objects that are LDAP objects. The roots of these subtrees have been assigned numeric values to indicate the sparcity of the tree.

Support for multiple protocols is desirable since different circumstances require different processing speeds. SNMP is a very simple protocol and the corresponding repository may be small enough to be resident in memory. Since queries are simple, very fast processing is possible. A repository capable of supporting SNMP would be appropriate for information that is changing rapidly and dynamically, such as packet traffic on a network.

LDAP is a much more complex protocol and the information in a repository supporting LDAP is often stored in secondary storage. It is well suited for information that is more static in nature, such as IP addresses associated with particular network interface cards. The advantage of LDAP is that complex, relational queries are possible. The present invention allows multiple repositories to coexist in a single logical composite repository where potential inconsistencies are eliminated.

CIM is a very general data model used to represent any type of information and, in itself, is independent of any protocol. XML (eXtensible Markup Language) is often used as a transport for CIM data, so, as a protocol, one refers to CIM/XML.

The present invention provides a mechanism by which each of these protocols is able to be used with objects in various repositories regardless of the particular format the repository supports. These repositories may be separate repositories or a combined repository.

Figure 4:
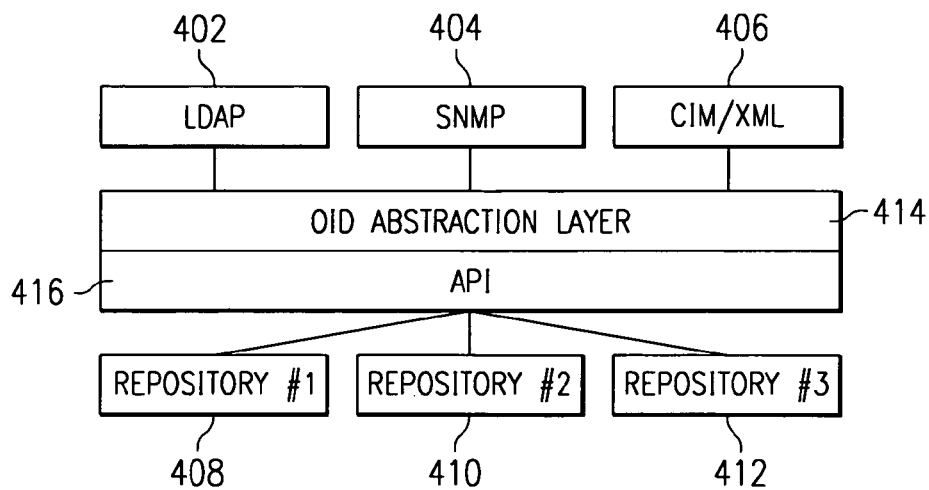
FIG. 4 is an exemplary block diagram showing the relationship between the OID Abstraction Layer to external queries and a logical composite repository.

With reference now to FIG. 4, an exemplary functional block diagram illustrating a managed server is provided. As shown in FIG. 4, the managed server includes an OID abstraction layer 414, a corresponding API 416, various repositories 408-412 and protocol interfaces 402-406. The elements shown in FIG. 4, in a preferred embodiment, are implemented as software executing on a managed server, such as server 200. Of course, some or all of these elements may also embodied as hardware elements without departing from the spirit and scope of the present invention as will be readily apparent to those of ordinary skill in the art.

As shown in FIG. 4, three protocol interfaces are provided through which queries may be received and reply messages may be sent: LDAP 402, SNMP 404, and CIM/XML 406. As one of ordinary skill in the art will appreciate, other protocols could be used provided the OID Abstraction Layer 414 has been programmed to recognize, process, and send responses according to the particular protocol.

Three repositories are shown, Repository #1 408, Repository #2 410, and Repository #3 412. Each repository uses an OID tree structure, similar to the structure illustrated in FIG. 3B. These repositories can be used to support a standard protocol or they may support a proprietary protocol. For example, Repository #1 408 may be suited to support SNMP, Repository #2 410 may be more suited to support LDAP, and Repository #3 412 may use a proprietary structure. The data itself is independent from the protocol, thus separable repositories can be stored in a single, logical composite tree structure.

OID Abstraction Layer 414 receives queries from applications using different protocols, e.g., SNMP, LDAP, CIM/XML, for object information maintained by one or more of the repositories 408-412. The OID Abstraction Layer 414 is able to interpret the received queries and determine the object information which is sought.

Based on the object information sought, the OID Abstraction Layer 414 identifies a repository in which the object information is maintained. This may be done, for example, based on a registry kept in the OID Abstraction Layer 414, as will be discussed hereafter. The repository identifies itself to the OID Abstraction Layer 414 by sending a registration message to the OID Abstraction Layer through the API 416.

The repositories 408-412 include data structures that store the object information as well as a software application that may be used to search and retrieve information from the data structures. These software applications are provided with the ability to communicate with the API 416. Each repository must be programmed to work with this API, regardless of the protocol or protocols supported by the repository. This protocol support is established when the subtree is registered with the OID abstraction layer 414. OID Abstraction Layer 414 maps all incoming requests, regardless of protocol, into an API request that the attached repository can understand.

When a request is received from API 416, the repository understands the request, searches the data structure for the requested object information, and sends a reply message to the API 416 with the requested object information. The API 416 provides the requested object information to the OID Abstraction Layer 414. The OID Abstraction Layer 414 then generates a reply message to the application that sent the request. The reply message is formatted for the particular protocol used in the request message from the requesting application. The reply message is then sent to the appropriate protocol interface 402-406.

As a more specific example, suppose that an SNMP query arrives via the SNMP interface 404 and the query deals with information in Repository #2 410 which has been registered to support the LDAP protocol. SNMP is a very simple protocol with operations like get, getnext, set, and so forth. The SNMP query is mapped into the API query and sent to the repository #2. When the response to the query is returned to OID Abstraction Layer 414, it is formatted into an SNMP response and sent back to the source of the query.

Not every protocol operation can be mapped into an equivalent operation in another protocol. For example, LDAP and CIM/XML can store information about relationships between nodes. Suppose Repository #2 410 contains information about five users and ten printers, and has registered with the OID abstraction layer as supporting the LDAP protocol. An LDAP query of "What printers are associated with user X" can be answered. However, SNMP does not contain this type of relational structure, so the objects in Repository #1 408, which have been registered as being able to support only the SNMP protocol, would not be able to respond to this type of query. If the OID Abstraction 414 received an LDAP query of the form "What printers are associated with User Y" where User Y is contained in Repository #1 408, OID Abstraction Layer 414 would have to respond that the query cannot be satisfied.

When a repository is added to the set of repositories, it is registered with OID Abstraction Layer 414 based on the protocol capabilities it can support. The registry provides information identifying the anchor points in the OID tree structure maintained by the repository. These anchor points are the objects in the OID tree structure that define a subtree of objects and their attributes. If a query is received for an object that has an OID that is below this anchor point in the OID tree structure, the OID Abstraction Layer 414 is able to determine that the object information for the requested object must be in the repository that maintains the object anchor point. In this way, the OID Abstraction Layer 414 is able to identify which repository maintains object information for a requested object.

Since all repositories support a standard OID format, it is natural to ask if two repositories can attempt to register for the same OID subtrees. The easiest approach is to not allow the registry to change and simply refuse the second attempt to re-register for the same subtree support. An alternative approach, which can be supported by a preferred embodiment, is to allow the registry to change, but the registration must always be unique and simply could be based on the last repository registration for a given subtree. In this instance, if the anchor point of the OID subtree structure is already registered with the OID abstraction layer, the registry may be overwritten.

A composite repository is beneficial in that only one repository has to maintain potentially multiple instances of single server resource. Thus, the problems associated with having multiple objects, supported by multiple repositories, referencing the same server resource are avoided. In addition, if a single repository is utilized, the need for the OID Abstraction Layer 414 to determine which repository maintains the object information would be greatly simplified.

Individual repositories can also be removed from the composite repository and the corresponding entries removed from the registry of OID Abstraction Layer 414. For example, many devices include uninstall programs for use when the device is removed from a particular domain. If the device had previous been added to the registry of OID Abstraction Layer 414, it is possible to have the uninstall program remove that entry.

Figure 5:
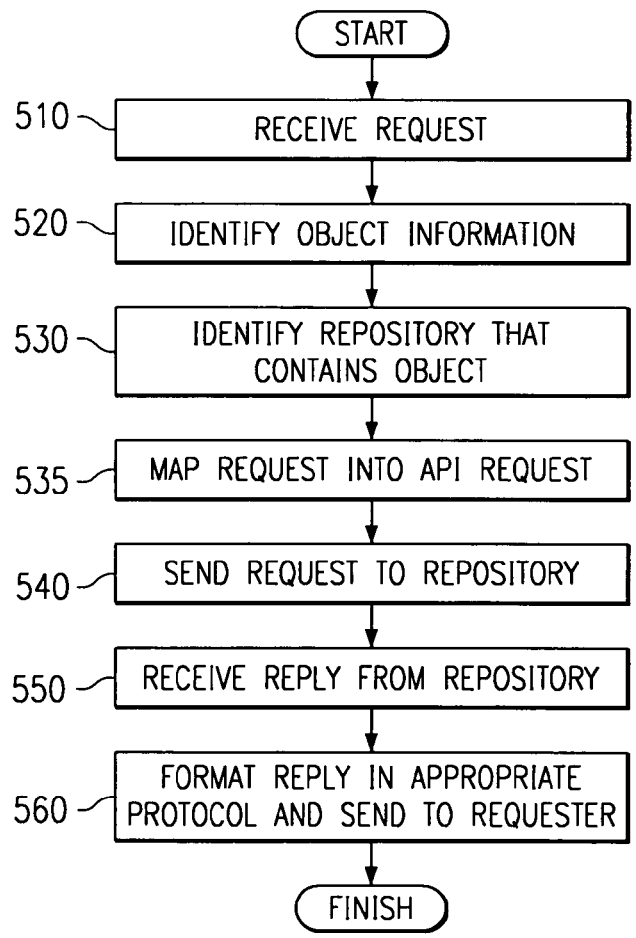
FIG. 5 is a flowchart outlining an exemplary operation of the present invention.

FIG. 5 is a flowchart outlining an exemplary operation of the present invention. As shown in FIG. 5, the operation starts with the receipt of a request message from an application in a particular communication protocol (step 510). The object information in the request is identified (step 520) and a repository that maintains this object information is identified based on a repository registry (step 530). The incoming request must be mapped to an equivalent request using the API (step 535). Once the repository is identified and the API request formulated, the request is sent to the repository for the object information (step 540). A reply message is received from the repository with the requested object information (step 550). The requested object information is then inserted into a reply message formatted to the protocol used by the requesting application and sent to the requesting application (step 560). The operation then ends.

Thus, the present invention provides a mechanism by which object information for objects in various repositories may be accessed regardless of the particular protocol used. Furthermore, the present invention provides a mechanism by which a combined repository may be utilized by a plurality of applications using different communication protocols.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method on a server in a distributed data processing system for maintaining a logical composite repository of Object Identifier (OID) tree structures, the method comprising the steps of:

receiving, in an OID abstraction layer, an OID tree structure from a repository; wherein the OID abstraction layer is capable of receiving queries for objects in two or more different protocols and supports the two or more different protocols by mapping queries from multiple protocol interfaces to application program interface (API) requests that the repository understands;

registering the OID tree structure with a registry associated with the OID abstraction layer; and adding the OID tree structure to a repository associated with the OID abstraction layer, wherein the repository is configured such that the repository recognizes requests from an application program interface (API) associated with the OID abstraction layer and sends reply messages to the API containing information retrieved from the repository, and wherein the OID abstraction layer receives the information retrieved from the repository through the API and encapsulates the information in a reply message to a target protocol interface, wherein the reply message is formatted for an appropriate protocol for the target protocol interface, and wherein the appropriate protocol is one of the two or more different protocols.

2. The method of claim 1, wherein the registry associated with the OID abstraction layer provides information identifying an anchor point in the OID subtree structure to be maintained by the repository.

3. The method of claim 2, wherein if the anchor point of the OID subtree structure is already registered with the OID abstraction layer, the registry is overwritten.

4. The method of claim 2, wherein if a query is received for an object that has an Object Identifier that is below a registered anchor point in an OID tree structure, the OID abstraction layer identifies a repository that maintains object information for the requested object based on the registered anchor point.

5. A method on a server in a distributed data processing system for maintaining a logical composite repository of Object Identifier (OID) tree structures, the method comprising the steps of:

receiving, in an OID abstraction layer, an OID tree structure from a repository; wherein the OID abstraction layer is capable of receiving queries for objects in two or more different protocols and supports the two or more different protocols by mapping queries from multiple protocol interfaces to application program interface (API) requests that the repository understands;

registering the OID tree structure with a registry associated with the OID abstraction layer; and adding the OID tree structure to a repository associated with the OID abstraction layer, wherein the OID abstraction layer receives a request for object data from a requesting protocol interface, interprets the request according to a protocol of the requesting protocol interface, wherein the protocol of the requesting protocol interface is one of the two or more different protocols, converts the request into an application program interface (API) request that is forwarded to the repository, and receives an API reply from the repository having the object data, and, wherein the OID abstraction layer reformats the object data in a reply message according to the protocol of the requesting protocol interface and sends the reply message to the requesting protocol interface.

6. A method on a server in a distributed data processing system for retrieving object data from a repository, comprising:

receiving a first query for the object data from a requester in the distributed data processing system, wherein the first query is in a protocol recognized by an OID abstraction layer; wherein the OID abstraction layer is capable of receiving queries for objects in two or more different protocols and supports the two or more different protocols by mapping queries from multiple protocol interfaces to application program interface (API) requests that the repository understands;

interpreting the first query according to the protocol recognized by the OID abstraction layer, wherein the protocol recognized by the OID abstraction layer is one of the two or more different protocols;

locating a repository that contains the object data requested in the first query based on a registry associated with the OID abstraction layer, wherein the first query is mapped into a second query, wherein the second query is consistent with an application program interface (API) associated with the OID abstraction layer, wherein the second query is sent to the repository that contains the object associated with the first query; and retrieving the object data from the repository using an OID abstraction layer application program interface (API), wherein a first reply is received at the API associated with the OID abstraction layer from the repository that contains the object associated with the first query, and wherein the first reply is transformed into a second reply, wherein the second reply is consistent with the protocol for the first query recognized by the OID abstraction layer, and wherein the protocol recognized by the OID abstraction layer is one of the two or more different protocols.

7. The method of claim 6, wherein if the first query cannot be mapped into a second query due to a limitation of the repository that contains the object associated with the first query, then the first query cannot be satisfied.

8. The method of claim 6, wherein the second reply is sent to the requester in the distributed data processing system.

9. A method on a server in a distributed data processing system for retrieving object data from a repository, comprising:

receiving a first query for the object data from a requester in the distributed data processing system, wherein the first query is in a protocol recognized by an OID abstraction layer; wherein the OID abstraction layer is capable of receiving queries for objects in two or more different protocols and supports the two or more different protocols by mapping queries from multiple protocol interfaces to application program interface (API) requests that the repository understands;

interpreting the first query according to the protocol recognized by the OID abstraction layer, wherein the protocol recognized by the OID abstraction layer is one of the two or more different protocols;

locating a repository that contains the object data requested in the first query based on a registry associated with the OID abstraction layer; and retrieving the object data from the repository using an OID abstraction layer application program interface (API), wherein each repository in a plurality of repositories contains information representing an Object Identifier (OID) subtree structure, and wherein the plurality of repositories are formatted to support the two or more different protocols.

10. The method of claim 9, wherein Simple Network Management Protocol (SNMP) is a protocol recognized by the OID abstraction layer.

11. The method of claim 9, wherein Lightweight Directory Access Protocol (LDAP) is a protocol recognized by the OID abstraction layer.

12. The method of claim 9, wherein Common Information Model used in conjunction with eXtendable Markup Language (CIM/XML) is a protocol recognized by the OID abstraction layer.

13. An apparatus on a server in a distributed data processing system for maintaining a logical composite repository of Object Identifier (OID) tree structures, the apparatus comprising:

an OID abstraction layer that receives an OID tree structure from a repository wherein the OID abstraction layer is capable of receiving queries for objects in two or more different protocols and supports the two or more different protocols by mapping queries from multiple protocol interfaces to application program interface (API) requests that the repository understands, a registry, associated with the OID abstraction layer, that registers the OID tree structure; and an adding means for adding the OID tree structure to a repository associated with the OID abstraction layer, wherein the repository is configured such that the repository recognizes requests received from an application program interface (API) associated with the OID abstraction layer and sends reply messages to the API containing information retrieved from the repository, and wherein the OID abstraction layer receives the information retrieved from the repositories through the API and encapsulates the information in a reply message to a target protocol interface, wherein the reply message is formatted for an appropriate protocol for the target protocol interface, and wherein the appropriate protocol is one of the two or more different protocols.

14. The apparatus of claim 13, wherein the registry provides information identifying an anchor point in the OID tree structure to be maintained by the repository.

15. The apparatus of claim 14, wherein if the anchor point of the OID tree structure is already registered in the registry, then the registry overwrites the previous entry.

16. The apparatus of claim 14, wherein, if the OID abstraction layer receives a query for an object that has an Object Identifier that is below a registered anchor point in an OID tree structure, the registry in the OID abstraction layer identifies a repository that maintains object information for the requested object based on the registered anchor point.

17. An apparatus on a server in a distributed data processing system for maintaining a logical composite repository of Object Identifier (OID) tree structures, the apparatus comprising:

an OID abstraction layer that receives an OID tree structure from a repository; wherein the OID abstraction layer is capable of receiving queries for objects in two or more different protocols and supports the two or more different protocols by mapping queries from multiple protocol interfaces to application program interface (API) requests that the repository understands;

a registry associated with the OID abstraction layer, that registers the OID tree structure; and an adding means for adding the OID tree structure to a repository associated with the OID abstraction layer, wherein the OID abstraction layer receives a request for object data from a requesting protocol interface, interprets the request according to a protocol of the requesting protocol interface, wherein the protocol of the requesting protocol interface is one of the two or more different protocols, converts the request into an application program interface (API) request that is forwarded to the repository, and receives an API reply from the repository having the object data, and wherein the OID abstraction layer encapsulates the object data in a reply message according to the protocol of the requesting protocol interface and sends the reply message to the requesting protocol interface.

18. An apparatus on a server in a distributed data processing system for retrieving object data from a repository, comprising:

a receiving means for receiving a first query for the object data from a requester in the distributed data processing system wherein the first query is in a protocol recognized by an OID abstraction layer; wherein the OID abstraction layer is capable of receiving queries for objects in two or more different protocols and supports the two or more different protocols by mapping queries from multiple protocol interfaces to application program interface (API) requests that the repository understands;

a interpreting means for interpreting the first query according to the protocol recognized by the OID abstraction layer, wherein the protocol recognized by the OID abstraction layer is one of the two or more different protocols;

a mapping means for mapping the first query into a second query, wherein the second query is consistent with an application program interface (API) associated with the OID abstraction layer;

a locating means for locating a repository that contains the object data requested in the first query based on a registry associated with the OID abstraction layer;

a first sending means, in the OID abstraction layer, that sends the second query to a repository that contains the object associated with the first query;

a retrieving means for retrieving the object data from the repository using an OID abstraction layer application program interface (API), wherein the retrieving means receives a first reply at the API from the repository that contains the object associated with the first query; and a transforming means, in the OID abstraction layer, that transforms the first reply into a second reply, wherein the second reply is consistent with the protocol for the first query recognized by the OID abstraction layer, and wherein the protocol recognized by the OID abstraction layer is one of the two or more different protocols.

19. The apparatus of claim 18, wherein if the mapping means cannot map the first query into a second query due to a limitation of the repository that contains the object associated with the first query, then the first query cannot be satisfied.

20. The apparatus of claim 18, further comprising a second sending means, in the OID abstraction layer, that sends the second reply to the requester in the distributed data processing system.

21. An apparatus on a server in a distributed data processing system for retrieving object data from a repository, comprising:

a receiving means for receiving a first query for the object data from a requester in the distributed-data processing system, wherein the first query is in a protocol recognized by an OID abstraction layer; wherein the OID abstraction layer is capable of receiving queries for objects in two or more different protocols and supports the two or more different protocols by mapping queries from multiple protocol interfaces to application program interface (API) requests that the repository understands;

a interpreting means for interpreting the first query according to the protocol recognized by the OID abstraction layer, wherein the protocol recognized by the OID abstraction layer is one of the two or more different protocols;

a locating means for locating a repository that contains the object data requested in the first query based on a registry associated with the OID abstraction layer; and a retrieving means for retrieving the object data from the repository using an OID abstraction layer application program interface (API), wherein each repository in a plurality of repositories contains Object Identifier (OID) tree structures, and wherein the plurality of repositories are formatted to support the two or more different protocols.

22. The apparatus of claim 21, wherein the receiving means recognizes a Simple Network Management Protocol (SNMP) query.

23. The apparatus of claim 21, wherein the receiving means recognizes a Lightweight Directory Access Protocol (LDAP) query.

24. The apparatus of claim 21, wherein the receiving means recognizes a Common Information Model used in conjunction with eXtendable Markup Language (CIM/XML) query.

25. A computer program product in a computer readable medium for maintaining a repository of Object Identifier (OID) tree structures, comprising:

instructions for receiving, in an OID abstraction layer, an OID tree structure from a repository; wherein the OID abstraction layer is capable of receiving queries for objects in two or more different protocols and supports the two or more different protocols by mapping queries from multiple protocol interfaces to application program interface (API) requests that the repository understands;

instructions for registering the OID tree structure with a registry associated with the OID abstraction layer;

instructions for adding the OID tree structure to a repository associated with the OID abstraction layer;

instructions for configuring the repository to recognize requests from an application program interface (API) associated with the OID abstraction layer and to send reply messages to the API containing information retrieved from the repository; and instructions for receiving the information retrieved from the repository, through the API, and encapsulating the information in a reply message to a target protocol interface, wherein the reply message is formatted for an appropriate protocol for the target protocol interface, and wherein the appropriate protocol is one of the two or more different protocols.

26. The computer program product of claim 25, further comprising instructions for maintaining the registry associated with the OID abstraction layer and providing information identifying an anchor point in the OID tree structure to be maintained by the repository.

27. The computer program product of claim 26, wherein if the anchor point of the OID tree structure is already registered with the OID abstraction layer, the instructions for registering overwrites the previous entry.

28. The computer program product of claim 26, further comprising instructions for identifying a repository that maintains object information for the requested object based on the registered anchor point if a query is received for an object that has an Object Identifier that is below a registered anchor point in an OID tree structure.

29. A computer program product in a computer readable medium for maintaining a repository of Object Identifier (OID) tree structures, comprising:

instructions for receiving, in an OID abstraction layer, an OID tree structure from a repository; wherein the OID abstraction layer is capable of receiving queries for objects in two or more different protocols and supports the two or more different protocols by mapping queries from multiple protocol interfaces to application program interface (API) requests that the repository understands;

instructions for registering the OID tree structure with a registry associated with the OID abstraction layer;

instructions for adding the OID tree structure to a repository associated with the OID abstraction layer;

instructions for receiving a request for object data from a requesting protocol interface;

instructions for interpreting the request according to a protocol of the requesting protocol interface, wherein the protocol of the requesting protocol interface is one of the two or more different protocols;

instructions for converting the request into an application program interface (API) request which is forwarded to the subtree repository;

instructions for receiving an API reply from the subtree repository having the object data; and instructions for encapsulating the object data in a reply message according to the protocol of the requesting protocol interface and sending the reply message to the requesting protocol interface.

30. A computer program product in a computer readable medium for retrieving object data from a repository, comprising:

instructions for receiving a first query for the object data from a requester in the distributed data processing system, wherein the first query is in a protocol recognized by an OID abstraction layer; wherein the OID abstraction layer is capable of receiving queries for objects in two or more different protocols and supports the two or more different protocols by mapping queries from multiple protocol interfaces to application program interface (API) requests that the repository understands;

instructions for mapping the first query into a second query, wherein the second query is consistent with an application program interface (API) associated with the OID abstraction layer;

instructions for interpreting the first query according to the protocol recognized by the OID abstraction layer, wherein the protocol recognized by the OID abstraction layer is one of the two or more different protocols;

instructions for locating a repository that contains the object data requested in the first query based on a registry associated with the OID abstraction layer;

instructions for sending the second query to the repository that contains the object associated with the first query;

instructions for retrieving the object data from the repository using an OID abstraction layer application program interface (API);

instructions for receiving a first reply at the API associated with the OID abstraction layer from the repository that contains the object associated with the first query; and instructions for transforming the first reply into a second reply, wherein the second reply is consistent with the protocol for the first query recognized by the OID abstraction layer, and wherein the protocol recognized by the OID abstraction layer is one of the two or more different protocols.

31. The computer program product of claim 30, wherein if the instructions for receiving the first query map cannot map the first query into a second query due to a limitation of the repository that contains the object associated with the first query, then the first query cannot be satisfied.

32. The computer program product of claim 30, further comprising instructions for sending the second reply to the requester in the distributed data processing system.

33. A computer program product in a computer readable medium for retrieving object data from a repository, comprising:

instructions for receiving a first query for the object data from a requester in the distributed data processing system, wherein the first query is in a protocol recognized by an OID abstraction layer; wherein the OID abstraction layer is capable of receiving queries for objects in two or more different protocols and supports the two or more different protocols by mapping queries from multiple protocol interfaces to application program interface (API) requests that the repository understands;

instructions for interpreting the first query according to the protocol recognized by the OID abstraction layer, wherein the protocol recognized by the OID abstraction layer is one of the two or more different protocols;

instructions for locating a repository that contains the object data requested in the first query based on a registry associated with the OID abstraction layer; and instructions for retrieving the object data from the repository using an OID abstraction layer application program interface (API), wherein each repository in a plurality repositories contains Object Identifier (OID) tree structures, and wherein the plurality of repositories are formatted to support the two or more different protocols.

34. The computer program product of claim 33, wherein instructions for receiving a first query recognize a Simple Network Management Protocol (SNMP) query.

35. The computer program product of claim 33, wherein instructions for receiving a first query recognize a Lightweight Directory Access Protocol (LDAP) query.

36. The computer program product of claim 33, wherein instructions for receiving a first query recognize a Common Information Model used in conjunction with eXtendable Markup Language (CIM/XML) query.

* * * * *